UNITED STATES PATENT OFFICE.

CHARLES D. BRADLEY, OF TAUNTON, MASSACHUSETTS.

IMPROVEMENT IN MEDICAL COMPOUNDS FOR NEUTRALIZING THE TASTE OF COD-LIVER OIL.

Specification forming part of Letters Patent No. 141,030, dated July 22, 1873; application filed May 1, 1873.

*To all whom it may concern:*

Be it known that I, CHARLES D. BRADLEY, of Taunton, of the county of Bristol and State of Massachusetts, have invented a new and useful Composition for Neutralizing the Taste of Cod-Liver Oil and promoting its digestion; and I do hereby declare the ingredients of the same and the method of making it to be described as follows:

In carrying out my invention I take a quantity of the essence of lemon—say, for instance, two quarts—and I add to this one quart of sulphuric ether. Afterward I add to the mixture three pints of one or more carminative essential oils, such as peppermint, carraway, or cloves, preferring to take one pint of each of them, as mentioned.

This liquid composition, when mixed with cod-liver oil in the proportion of about a dozen drops of the mixture to one table-spoonful of the oil, will not only neutralize the disagreeable taste of the oil to a person, but operate medically with useful effects, for the essence of lemon will act upon the stomach as an acid and a stimulant. The carminative oil or oils operate as a stimulant and a tonic, while the ether is a sedative to the nervous system and a stimulant to the duodenum and the pancreas, whereby their secretions are increased, and digestion of the oil promoted, as a matter of course.

The compound has the beneficial effect of preventing, mostly if not entirely, the regurgitations which generally follow the introduction of cod-liver oil into the stomach.

I do not confine my invention to the precise proportions of the ingredients as above stated, as such may be varied somewhat without effecting any material change in the result.

I have sometimes substituted alcohol for the essence of lemon; but I have found the compound not so beneficial.

I claim as my invention—

The composition, substantially as and for the purpose described, consisting of one or more carminative essential oils, sulphuric ether, and the essence of lemon, or the equivalent of the latter, all as set forth.

CHARLES D. BRADLEY.

Witnesses:
  R. H. EDDY,
  J. R. SNOW.